United States Patent
Sivakumar et al.

(10) Patent No.: US 12,248,093 B2
(45) Date of Patent: Mar. 11, 2025

(54) SYSTEM AND METHOD FOR TRAINING A NEURAL NETWORK TO PERFORM OBJECT DETECTION USING LIDAR SENSORS AND RADAR SENSORS

(71) Applicants: DENSO CORPORATION, Kariya (JP); Carnegie Mellon University, Pittsburgh, PA (US)

(72) Inventors: Prasanna Sivakumar, Pittsburgh, PA (US); Shawn Hunt, Bethel Park, PA (US); Kris Kitani, Pittsburgh, PA (US); Matthew O'Toole, Pittsburgh, PA (US); Yu-Jhe Li, Pittsburgh, PA (US)

(73) Assignees: DENSO CORPORATION, Kariya (JP); Carnegie Mellon University, Pittsburgh, PA (US)

( * ) Notice: Subject to any disclaimer, the term of this patent is extended or adjusted under 35 U.S.C. 154(b) by 382 days.

(21) Appl. No.: 17/832,906

(22) Filed: Jun. 6, 2022

(65) Prior Publication Data
US 2023/0130588 A1 Apr. 27, 2023

Related U.S. Application Data

(60) Provisional application No. 63/263,103, filed on Oct. 27, 2021.

(51) Int. Cl.
*G01S 7/41* (2006.01)
*G01S 13/89* (2006.01)
(Continued)

(52) U.S. Cl.
CPC .............. *G01S 7/417* (2013.01); *G01S 13/89* (2013.01); *G01S 17/89* (2013.01); *G06N 3/045* (2023.01); *G06V 20/58* (2022.01)

(58) Field of Classification Search
CPC .......... G01S 7/417; G01S 13/89; G01S 17/89; G06V 20/58; G06N 3/045
See application file for complete search history.

(56) References Cited

U.S. PATENT DOCUMENTS 10,205,457 B1 2/2019 Josefsberg et al.
11,927,668 B2 * 3/2024 Fontijne .................. G06V 20/58
(Continued)

FOREIGN PATENT DOCUMENTS

CN 109597088 B 4/2019

OTHER PUBLICATIONS

Qian et al., Robust Multimodal Vehicle Detection in Foggy Weather Using Complementary Lidar and Radar Signals, 10 pages.
(Continued)

*Primary Examiner* — Utpal D Shah
(74) *Attorney, Agent, or Firm* — Harness, Dickey & Pierce, P.L.C.

(57) ABSTRACT

A method includes generating a radar-based intensity map and a lidar-based intensity map and performing one or more augmentation routines on the radar-based intensity map and the lidar-based intensity map to generate a radar input and a lidar input. The method includes generating a plurality of teacher-based bounding boxes and a plurality of student-based bounding boxes based on the radar input and the lidar input. The method includes determining a loss value of the plurality of student-based bounding boxes based on the plurality of teacher-based bounding boxes and a plurality of ground truth bounding boxes, updating one or more weights of the student neural network based on the loss value, and updating one or more weights of the teacher neural network based on a moving average associated with the one or more weights of the student neural network.

20 Claims, 7 Drawing Sheets

(51) Int. Cl.
*G01S 17/89* (2020.01)
*G06N 3/045* (2023.01)
*G06V 20/58* (2022.01)

(56) References Cited

U.S. PATENT DOCUMENTS

| | | | |
|---|---|---|---|
| 2020/0041612 A1 | 2/2020 | Harrison | |
| 2021/0255304 A1 | 8/2021 | Fontijne et al. | |
| 2022/0237890 A1* | 7/2022 | Choi | G06N 3/084 |
| 2023/0042750 A1* | 2/2023 | Kumar | G06T 7/50 |
| 2024/0394514 A1* | 11/2024 | Hnewa | G06N 3/045 |

OTHER PUBLICATIONS

Shah, et al., LiRaNet: End-to-End Trajectory Prediction using Spatio-Temporal Radar Fusion, 4th Conference on Robot Learning (CoRL), 2020, pp. 1-17, Cambridge, MA.

"Unsupervised Domain Adaptive 3D Detection with Multi-Level Consistency," Zhipeng Luo, et al., arxiv.org, Cornell University Library, 201 Olin Library Cornell University Ithaca, NY 14853, Jul. 23, 2021 (Jul. 23, 2021), XP091016166.

"Efficient Multi-Sensor Extended Target Tracking using GM-PHD Filter," Ahrabian Alireza, et al., 2019 IEEE Intelligent Vehicles Symposium (IV), IEEE, Jun. 9, 2019 (Jun. 9, 2019), pp. 1731-1738, XP033606231.

"Uncertainty-aware Mean Teacher for Source-free Unsupervised Domain Adaptive 3D Object Detection," Deepti Hegde, et al., arxiv.org, Cornell University Library, 201 Olin Library Cornell University Ithaca, NY 14853, Sep. 29, 2021 (Sep. 29, 2021), XP091061142.

"Robust Multimodal Vehicle Detection in Foggy Weather Using Complementary Lidar and Radar Signals," Qian Kun, et al., 2021 IEEE/CVF Conference on Computer Vision and Pattern Recognition (CVPR), IEEE, Jun. 20, 2021 (Jun. 20, 2021), pp. 444-453, XP034007981, DOI: 10.1109/CVPR46437.2021.00051.

\* cited by examiner

SYSTEM AND METHOD FOR TRAINING A NEURAL NETWORK TO PERFORM OBJECT DETECTION USING LIDAR SENSORS AND RADAR SENSORS

CROSS-REFERENCE TO RELATED APPLICATIONS

This application is a U.S. patent application, which claims priority to and the benefit of U.S. Provisional Patent Application No. 63/263,103 filed Oct. 27, 2021. The disclosures of the above applications are incorporated herein by reference.

FIELD

The present disclosure relates to systems and methods for training a neural network to perform object detection using lidar sensors and radar sensors.

BACKGROUND

The statements in this section merely provide background information related to the present disclosure and may not constitute prior art.

Autonomous and semi-autonomous vehicles use light detection and ranging (lidar) sensors or radar sensors to detect objects in an environment surrounding the vehicle and to perform localization routines, such as a driver assistance routine, an adaptive cruise control routine, a braking routine, and/or an object detection routine. However, radar sensors may provide lower data resolution compared to lidar sensors, thereby inhibiting the accuracy of the localization routines. Furthermore, while lidar sensors have higher resolution compared to radar sensors, adverse weather conditions inhibit the accuracy of the localization routines when using lidar sensors. Specifically, lidar beams may refract off droplets formed by, for example, fog, rain, and/or snow.

SUMMARY

This section provides a general summary of the disclosure and is not a comprehensive disclosure of its full scope or all of its features.

The present disclosure provides a method for training a student neural network to detect one or more objects based on radar data obtained from one or more radar sensors and lidar data obtained from one or more lidar sensors. The method includes generating a radar-based intensity map based on the radar data and a lidar-based intensity map based on the lidar data, performing one or more augmentation routines on the radar-based intensity map and the lidar-based intensity map to generate a radar input and a lidar input, generating, using a teacher neural network, a plurality of teacher-based bounding boxes based on the radar input and the lidar input, and generating, using the student neural network, a plurality of student-based bounding boxes based on the radar input and the lidar input. The method includes determining a loss value of the plurality of student-based bounding boxes based on the plurality of teacher-based bounding boxes and a plurality of ground truth bounding boxes, updating one or more weights of the student neural network based on the loss value, and updating one or more weights of the teacher neural network based on a moving average associated with the one or more weights of the student neural network.

In one form, performing the one or more augmentation routines on the radar-based intensity map and the lidar-based intensity map to generate the radar input and the lidar input further comprises performing a first augmentation routine on the radar-based intensity map to generate the radar input, performing the first augmentation routine on the lidar-based intensity map to generate an augmented lidar input, and performing a second augmentation routine on the augmented lidar input to generate the lidar input. In one form, the first augmentation routine is a translation routine, a rotation routine, a scaling routine, a flipping routine, or a combination thereof. In one form, the second augmentation routine is a noise augmentation routine.

In one form, generating, using the teacher neural network, the plurality of teacher-based bounding boxes based on the radar input and the lidar input further comprises extracting one or more radar-based features based on the radar input and one or more lidar-based features based on the lidar input, generating a plurality of radar-based proposed bounding boxes based on the one or more radar-based features and a plurality of lidar-based proposed bounding boxes based on the one or more lidar-based features, concatenating the plurality of radar-based proposed bounding boxes and the plurality of lidar-based proposed bounding boxes to generate a tensor, and performing a regression routine on the tensor to generate the plurality of teacher-based bounding boxes. In one form, the plurality of radar-based proposed bounding boxes and the plurality of lidar-based proposed bounding boxes are concatenated over a predefined period of time.

In one form, generating, using the student neural network, the plurality of student-based bounding boxes based on the radar input and the lidar input further comprises extracting one or more radar-based features based on the radar input and one or more lidar-based features based on the lidar input, generating a plurality of radar-based proposed bounding boxes based on the one or more radar-based features and a plurality of lidar-based proposed bounding boxes based on the one or more lidar-based features, concatenating the plurality of radar-based proposed bounding boxes and the plurality of lidar-based proposed bounding boxes to generate a tensor, and performing a regression routine on the tensor to generate the plurality of student-based bounding boxes. In one form, the plurality of radar-based proposed bounding boxes and the plurality of lidar-based proposed bounding boxes are concatenated over a predefined period of time. In one form, the moving average associated with the one or more weights of the student neural network is an exponential moving average. In one form, the method includes determining the student neural network is trained in response to the loss value being less than a threshold value.

The present disclosure provides a system for training a student neural network to detect one or more objects based on radar data obtained from one or more radar sensors and lidar data obtained from one or more lidar sensors. The system includes one or more processors and one or more nontransitory computer-readable mediums storing instructions that are executable by the one or more processors. The instructions include generating a radar-based intensity map based on the radar data and a lidar-based intensity map based on the lidar data, performing one or more augmentation routines on the radar-based intensity map and the lidar-based intensity map to generate a radar input and a lidar input, generating, using a teacher neural network, a plurality of teacher-based bounding boxes based on the radar input and the lidar input, and generating, using the student neural network, a plurality of student-based bounding boxes based on the radar input and the lidar input. The instructions include determining a loss value of the plurality of student-based bounding boxes based on the plurality of teacher-based bounding boxes and a plurality of ground truth bounding boxes, updating one or more weights of the student neural network based on the loss value, updating one or more weights of the teacher neural network based on an exponential moving average associated with the one or more weights of the student neural network, and determining the student neural network is trained in response to the loss value being less than a threshold value.

The present disclosure provides a method for training a student neural network to detect one or more objects based on radar data obtained from one or more radar sensors and lidar data obtained from one or more lidar sensors. The method includes generating a radar-based intensity map based on the radar data and a lidar-based intensity map based on the lidar data, performing one or more augmentation routines on the radar-based intensity map and the lidar-based intensity map to generate a radar input and a lidar input, generating, using a teacher neural network, a plurality of teacher-based bounding boxes based on the radar input and the lidar input, and generating, using the student neural network, a plurality of student-based bounding boxes based on the radar input and the lidar input. The method includes determining a loss value of the plurality of student-based bounding boxes based on the plurality of teacher-based bounding boxes and a plurality of ground truth bounding boxes, updating one or more weights of the student neural network based on the loss value, updating one or more weights of the teacher neural network based on an exponential moving average associated with the one or more weights of the student neural network, and determining the student neural network is trained in response to the loss value being less than a threshold value.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for training a student neural network to detect one or more objects based on radar data and lidar data. The student neural network employs deep neural network routines and selectively updates its corresponding weights based on a loss value, which is based on differences between bounding boxes generated by a teacher neural network and ground truth bounding boxes. Furthermore, a teacher neural network concurrently is trained based on moving averages of the weights of the student neural network to enhance the robustness and accuracy of the student neural network. Accordingly, the student neural network, when provided in an automotive controller, may perform the localization routines with improved accuracy when the reliability of the radar data is inhibited due to the sparsity of the radar data and/or the reliability of the lidar data is inhibited due to various weather and climate conditions, such as the presence of rain, fog, and/or snow.

Figure 1:
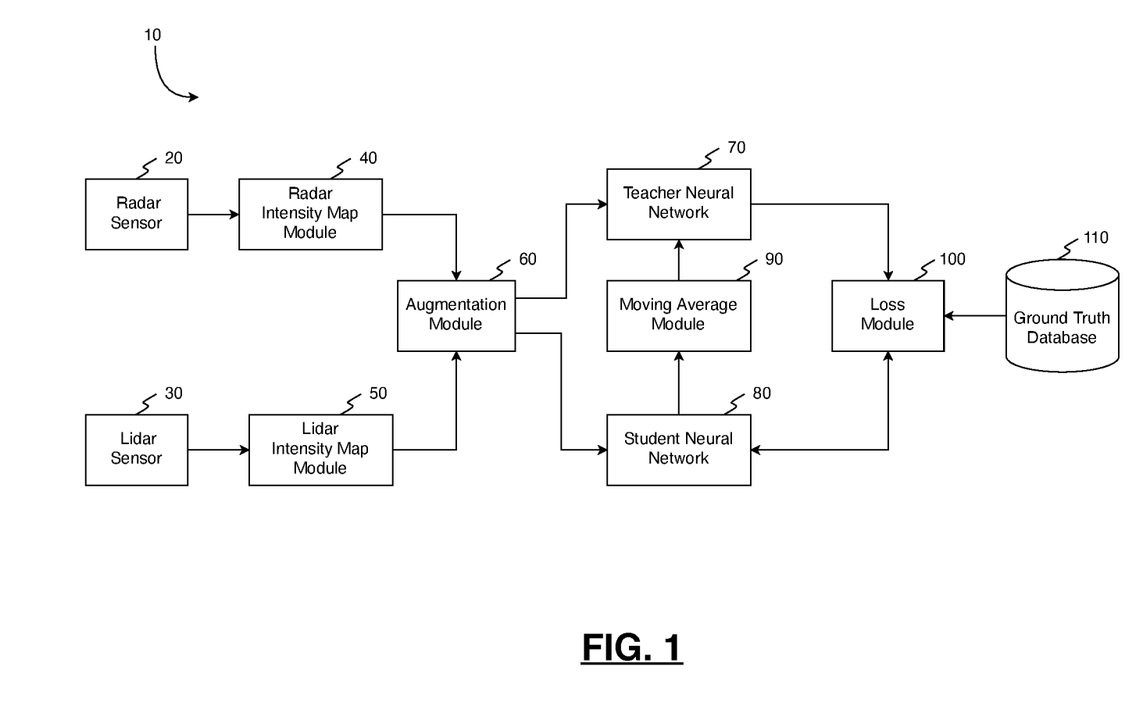
FIG. 1 is a functional block diagram of a training system in accordance with the teachings of the present disclosure.

Referring to FIG. 1, a training system 10 is provided and generally includes a radar sensor 20, a lidar sensor 30, a radar intensity map module 40, a lidar intensity map module 50, an augmentation module 60, a teacher neural network 70, a student neural network 80, a moving average module 90, a loss module 100, and a ground truth database 110. It should be readily understood that any one of the components of the training system 10 can be provided at the same location or distributed at different locations (e.g., via one or more edge computing devices) and communicably coupled accordingly. In one form, the components of the training system 10 are communicably coupled using a wired or a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others). Although one radar sensor 20 and one lidar sensor 30 are shown, it should be understood that the training system 10 may include any number of radar sensors 20 and lidar sensors 30.

In one form, the radar sensor 20 detects contours and ranges of various objects of an environment surrounding a vehicle and/or the radar sensor 20, such as traffic infrastructure, obstructions, pedestrians, other vehicles, among other objects. Specifically, the radar sensor 20 includes a radar emitter system that emits millimeter waves and a radar receiver system that obtains one or more radar echoes associated with the objects in the surrounding environment and generates radar data associated with the contours and ranges of the detected objects.

In one form, the lidar sensor 30 detects contours and ranges of various objects of an environment surrounding a vehicle and/or the lidar sensor 30. Specifically, the lidar sensor 30 includes a laser system that emits a laser and a photodetector system that obtains various reflection metrics associated with one or more reflected signals associated with the objects in the surrounding environment, such as a timestamp associated with the reflected signals, a light intensity value that is based on a luminosity of the environment surrounding the vehicle, and a surface reflectance value that is based on a signal strength of the reflected signals. In one form, the lidar sensor 30 is provided by a single photon avalanche diode (SPAD)-based lidar sensor, but it should be understood that the lidar sensor 30 may be provided by any type of lidar sensor.

In one form, the radar intensity map module 40 generates a radar-based intensity map based on the radar data. As an example, the radar-based intensity map includes a plurality of radar data points that correspond to an edge, contour, or surface of a detected object surrounding a vehicle and/or the radar sensor 20. In one form, each of the radar data points is a position coordinate relative to a predefined origin (e.g., the radar sensor 20, a predefined reference point of the vehicle, among others), such as a cartesian coordinate representing a two-dimensional displacement (i.e., an XY cartesian coordinate) or a three-dimensional displacement (i.e., an XYZ cartesian coordinate) relative to the predefined origin.

In one form, the lidar intensity map module 50 generates a lidar-based intensity map based on the lidar data obtained by the lidar sensor 30. The lidar-based intensity map includes a plurality of lidar data points that correspond to an edge, contour, or surface of a detected object surrounding the vehicle. In one form, each of the lidar data points is a position coordinate relative to a predefined origin (e.g., the lidar sensor 30, a predefined reference point of the vehicle, among others), such as a cartesian coordinate.

In one form, the radar-based intensity map generated by the radar intensity map module 40 and the lidar-based intensity map generated by the lidar intensity map module 50 have different data point resolutions. As an example, the radar-based intensity map may include two-hundred radar data points, and the lidar-based intensity map may include thirty-five thousand lidar data points.

In one form, the augmentation module 60 performs one or more augmentation routines on the radar-based intensity map and the lidar-based intensity map to generate a radar input and a lidar input. As an example, the augmentation module 60 performs a first augmentation routine on the radar-based intensity map to generate the radar input. As another example, the augmentation module 60 performs the first augmentation routine on the lidar-based intensity map to generate an augmented lidar input. Examples of the first augmentation routine include, but are not limited to: a translation routine, a rotation routine, a scaling routine, a flipping routine, or a combination thereof.

As used herein, the "translation routine" refers to shifting at least one of an X-coordinate, a Y-coordinate, and a Z-coordinate of the radar data points of the radar-based intensity map and/or the lidar data points of the lidar-based intensity map by a respective translation value. As used herein, the "rotation routine" refers to rotating at least one of an X-coordinate, a Y-coordinate, and a Z-coordinate of the radar data points of the radar-based intensity map and/or the lidar data points of the lidar-based intensity map by a respective angular value. As used herein, the "scaling routine" refers to multiplying at least one of an X-coordinate, a Y-coordinate, and a Z-coordinate of the radar data points of the radar-based intensity map and/or the lidar data points of the lidar-based intensity map by a respective scaling value. As used herein, the "flipping routine" refers to adjusting a sign of at least one of an X-coordinate, a Y-coordinate, and a Z-coordinate of the radar data points of the radar-based intensity map and/or the lidar data points of the lidar-based intensity map. It should be understood that the first augmentation routine may be provided by other augmentation routines and is not limited to the examples described herein.

In some forms, the augmentation module 60 performs a second augmentation routine on the augmented lidar input to generate a lidar input. In one form, the second augmentation routine is a noise augmentation routine, which may include a Gaussian noise function or other noise function configured to add noise to the lidar data points. In some forms, the noise augmentation routine is configured to simulate adverse weather conditions that inhibit the quality and reliability of the lidar data points, such as rain, fog, and snow. It should be understood that the second augmentation routine may be provided by other augmentation routines and is not limited to the example described herein.

Figure 2:
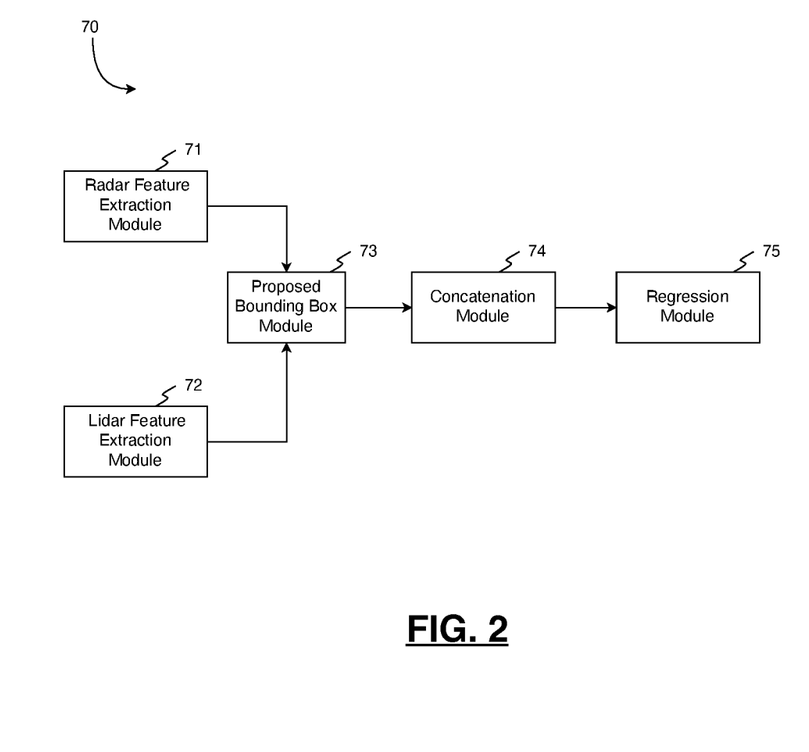
FIG. 2 is a functional block diagram of a teacher neural network in accordance with the teachings of the present disclosure.
Figure 3:
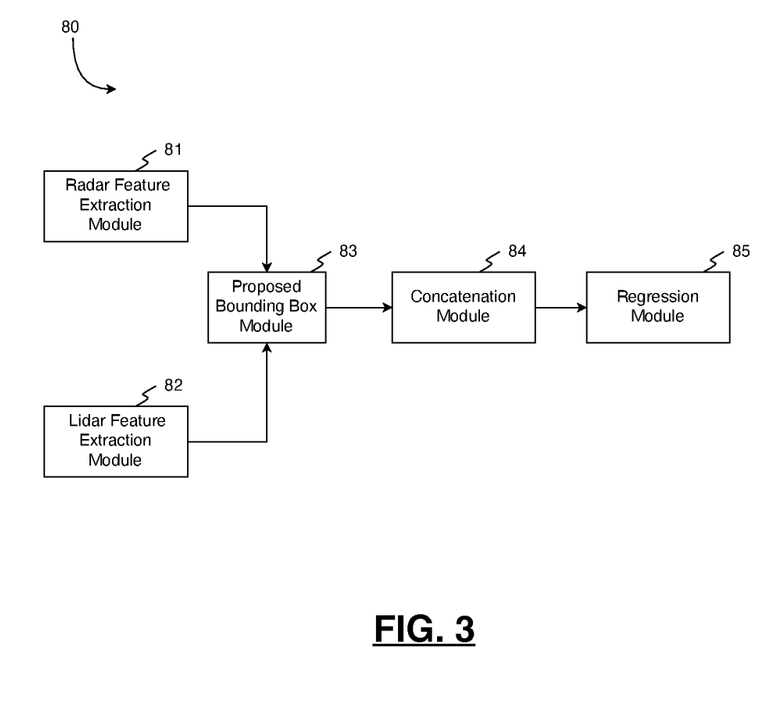
FIG. 3 is a functional block diagram of a student neural network in accordance with the teachings of the present disclosure.

In one form and referring to FIGS. 1-3, the teacher neural network 70 is configured to generate a plurality of teacher-based bounding boxes based on the radar input and the lidar input, and the student neural network 80 is configured to generate a plurality of student-based bounding boxes based on the radar input and the lidar input. In one form, the teacher neural network 70 includes a radar feature extraction module 71, a lidar feature extraction module 72, a proposed bounding box module 73, a concatenation module 74, and a regression module 75. In one form, the student neural network 80 includes a radar feature extraction module 81, a lidar feature extraction module 82, a proposed bounding box module 83, a concatenation module 84, and a regression module 85.

In order to execute the functionality described herein, the teacher neural network 70 and the student neural network 80 may each include one or more processor circuits that execute machine-readable instructions stored in a nontransitory computer-readable medium, such as a read-only memory (ROM) circuit and/or a random-access memory (RAM) circuit. In one form, the teacher neural network 70 and student neural network 80 each include one or more convolutional neural networks (CNN), such as a region-based convolutional neural network (R-CNN). While CNN routines are described herein, it should be understood that the teacher neural network 70 and the student neural network 80 may be replaced with other deep learning networks, systems, and/or modules configured to perform the morphological operations described herein, such as a computer vision system.

The radar feature extraction module 71 extracts one or more radar-based features based on the radar input. In one form, the one or more radar-based features are vectors that represent, for example, whether a given portion of the radar input corresponds to an edge or contour of an object. As an example, the radar feature extraction module 71 is provided by one or more convolutional layers and one or more pooling layers that iteratively perform a convolution and pooling routine, respectively, to extract the radar-based features. Accordingly, the one or more convolutional layers may be defined by any suitable combination of parameters including, but not limited to: weights, kernel dimensions, number of kernels, stride values, padding values, input/output channels, bit depths, and rectified linear unit (ReLU) activation layers. Furthermore, the one or more pooling layers may be defined by any suitable combination of parameters including, but not limited to: the type of pooling routine (e.g., a maximum pooling routine, an average pooling routine, an L2-norm pooling routine, among others), kernel dimensions, and sliding values. The radar feature extraction module 81 is configured in a similar manner as the radar feature extraction module 71 and, as such, the description thereof is omitted for brevity.

The lidar feature extraction module 72 extracts one or more lidar-based features based on the lidar input. In one form, the one or more lidar-based features are vectors that represent, for example, whether a given portion of the lidar input corresponds to an edge or contour of an object. As an example, the lidar feature extraction module 72 is provided by one or more convolutional layers and one or more pooling layers that iteratively perform a convolution and pooling routine, respectively, to extract the lidar-based features. The lidar feature extraction module 82 is configured in a similar manner as the lidar feature extraction module 72 and, as such, the description thereof is omitted for brevity.

The proposed bounding box module 73 generates a plurality of radar-based proposed bounding boxes based on the one or more radar-based features and a plurality of lidar-based proposed bounding boxes based on the one or more lidar-based features. The radar-based proposed bounding boxes and the lidar-based proposed bounding boxes are collectively referred to hereinafter as "proposed bounding boxes." In one form, the proposed bounding box module 73 is employed by a region proposal network (RPN) or a Faster R-CNN that generates the proposed bounding boxes (e.g., rotated bounding boxes or non-rotated bounding boxes) that surround detected objects by performing known bounding box generation routines to identify edges/contours and to generate the corresponding bounding boxes.

In some forms, the proposed bounding box module 73 may additionally determine one or more features associated with the proposed bounding boxes (e.g., an object type and/or object metrics associated with the lidar-based or radar-based proposed bounding boxes). As an example, the proposed bounding box module 73 includes one or more pooling layers that calculate a distance between edges, angular displacement of the edges of the proposed bounding box, area of the proposed bounding box, and/or a length/width of the edges of the proposed bounding box and output a feature vector corresponding to the features of the proposed bounding boxes. The proposed bounding box module 83 is configured in a similar manner as the proposed bounding box module 73 and, as such, the description thereof is omitted for brevity.

The concatenation module 74 concatenates the proposed bounding boxes to generate a tensor. In one form, the tensor may have any number of dimensions to represent the feature vector associated with the proposed bounding boxes, the weights and biases of the radar feature extraction module 71, the weights and biases of the lidar feature extraction module 72, the weights and biases of the proposed bounding box module 73, and/or the discrete time value associated with the generation of the proposed bounding boxes. To perform the functionality described herein, the concatenation module 74 may employ one or more self-attention modules that generate residual outputs based on the feature vectors associated with the bounding boxes and one or more cross-attention modules to concatenate the residual outputs into the tensor. In one form, the concatenation module 74 concatenates the proposed bounding boxes over a predefined period of time to generate the tensor and enhance the accuracy of the teacher neural network 70. The concatenation module 84 is configured in a similar manner as the concatenation module 74 and, as such, the description thereof is omitted for brevity.

The regression module 75 performs a regression routine on the tensor to generate the plurality of teacher-based bounding boxes. In one form, the regression routine is configured to selectively adjust a portion of the tensor that corresponds to the features of the proposed bounding boxes.

As an example, the regression routine selectively updates the portion of the tensor corresponding to the distance between edges, the angular displacement of the edges of the proposed bounding box, the area of the proposed bounding box, and/or the length/width of the edges of the proposed bounding box. Example regression routines include, but are not limited to: linear tensor regression routines (e.g., a linear tensor regression routine, a penalized tensor regression routine, a Bayesian tensor regression routine, a quantile tensor regression routine, a projection-based tensor regression, among others) or nonlinear tensor regression routines (e.g., kernel routines, Gaussian tensor routines, random forest tensor regression routines, among others). As such, the regression routines may enhance the accuracy of the proposed bounding boxes corresponding to the detected objects of the environment. To perform the functionality described herein, the regression module 75 may be employed by various known tensor regression networks. The regression module 85 performs similar regression routines on the tensor as the regression module 75 to generate the plurality of student-based bounding boxes.

In one form, the moving average module 90 is configured to determine a moving average associated with the one or more weights of the student neural network 80 and selectively update one or more weights of the teacher neural network 70 based on the moving average. As an example, the moving average module 90 determines an average of the weights of the radar feature extraction module 81 (vectors $A_1$-$A_{11}$) and obtains the iteration value (1-11) of the CNN routine performed by the radar feature extraction module 81. Furthermore, the moving average module 90 determines the weights of the radar feature extraction module 71 (vectors $B_1$-$B_{11}$) by determining, for each iteration, an exponential moving average (vectors $EMA_1$-$EMA_{10}$), as shown below in Table 1.

TABLE 1

Example Weights of the Radar Feature Extraction Modules (RFEM) 71, 81

| | Iteration | Weights of RFEM 81 | Weights of RFEM 71 |
|---|---|---|---|
| Weights | 1 | $A_1$ | $B_1 = \beta A_1$ |
| | 2 | $A_2$ | $B_2 = \beta A_2 + (1 - \beta) EMA_1$ |
| | 3 | $A_3$ | $B_3 = \beta A_3 + (1 - \beta) EMA_2$ |
| | 4 | $A_4$ | $B_4 = \beta A_4 + (1 - \beta) EMA_3$ |
| | 5 | $A_5$ | $B_5 = \beta A_5 + (1 - \beta) EMA_4$ |
| | 6 | $A_6$ | $B_6 = \beta A_6 + (1 - \beta) EMA_5$ |
| | 7 | $A_7$ | $B_7 = \beta A_7 + (1 - \beta) EMA_6$ |
| | 8 | $A_8$ | $B_8 = \beta A_8 + (1 - \beta) EMA_7$ |
| | 9 | $A_9$ | $B_9 = \beta A_9 + (1 - \beta) EMA_8$ |
| | 10 | $A_{10}$ | $B_{10} = \beta A_{10} + (1 - \beta) EMA_9$ |
| | 11 | $A_{11}$ | $B_{11} = \beta A_{11} + (1 - \beta) EMA_{10}$ |

In Table 1, $\beta$ is a weighting coefficient given to current weights of the radar feature extraction module 81 and previous exponential moving averages (i.e., larger values of $\beta$ correspond to giving less weight to previous exponential moving averages). In some forms, the exponential moving averages may be a function of each preceding average weight value or a set of each preceding average weight value (e.g., the exponential moving average is calculated based on the average weight of the five preceding iterations). While an exponential moving average is disclosed, it should be understood that other types of moving averages may be employed and is not limited to the example described herein, such as simple moving averages, smoothed moving averages, linear weighted moving averages, among other moving average types. Additionally, while Table 1 illustrates the example weights of the radar feature extraction modules 71, 81, it should be understood that the moving average module 90 may selectively update the weights of the lidar feature extraction module 72, the proposed bounding box module 73, the concatenation module 74, and the regression module 75, based on the weights of the lidar feature extraction module 82, the proposed bounding box module 83, the concatenation module 84, and the regression module 85, respectively, in a similar manner.

In one form, the loss module 100 is configured to determine a loss value of the plurality of student-based bounding boxes based on the plurality of teacher-based bounding boxes and a plurality of ground truth bounding boxes stored in the ground truth database 110. In one form, each of the ground truth bounding boxes correspond to known object types (e.g., person, another vehicle, a bicyclist, traffic infrastructure, among other objects that may be proximate to and/or surround a vehicle) and are defined during a training routine of training system 10.

In one form, the loss module 100 determines the loss value by performing a bounding box refinement loss routine and selectively adjusts one or more weights of the student neural network 80 based on the loss value. As an example, the bounding box refinement loss routine may output a loss value that is a function of a difference between an orientation, area, length, width, and distance between edges of the proposed bounding boxes (as defined by the feature vector) output by the teacher neural network 70 and the orientation, area, length, width, and distance between edges of the of the corresponding ground truth bounding box. If the loss value is greater than a threshold value, the loss module 100 determines that the student neural network 80 is not trained and updates the one or more weights of the radar feature extraction module 81, the lidar feature extraction module 82, the proposed bounding box module 83, the concatenation module 84, and/or the regression module 85. Moreover, the loss module 100 determines that the student neural network 80 is trained in response to the loss value being less than a threshold value. As such, when the student neural network 80 is sufficiently trained, the student neural network 80 is configured to autonomously generate the bounding boxes and one or more feature vectors corresponding to the identified object types of the objects surrounding a vehicle, thereby enabling the vehicle to accurately perform various localization routines based on the lidar data and/or the radar data in various weather and climate conditions.

Figure 4:
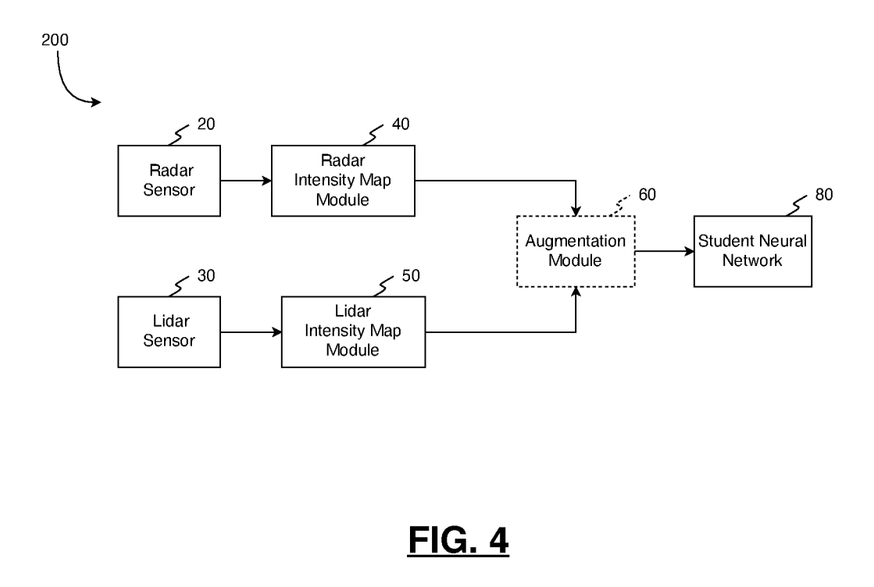
FIG. 4 is a functional block diagram of a trained student neural network that is provided in a vehicle in accordance with the teachings of the present disclosure.

Referring to FIG. 4, a vehicle 200 is shown and generally includes the radar sensor 20, the lidar sensor 30, the radar intensity map module 40, the lidar intensity map module 50, and the trained student neural network 80. In one form, the vehicle 200 optionally includes the augmentation module 60 to perform the one or more augmentation routines on the radar-based intensity map and the lidar-based intensity map. In one form, the components of the vehicle 200 are communicably coupled by a vehicle communication network, such as a controlled area network (CAN), a local interconnect network (LIN), and/or other suitable communication networks. In one form, the trained student neural network 80 is configured to perform localization routines, such as an object detection routine, based on the radar data and the lidar data obtained from the radar sensor 20 and the lidar sensor 30, respectively.

Figure 5:
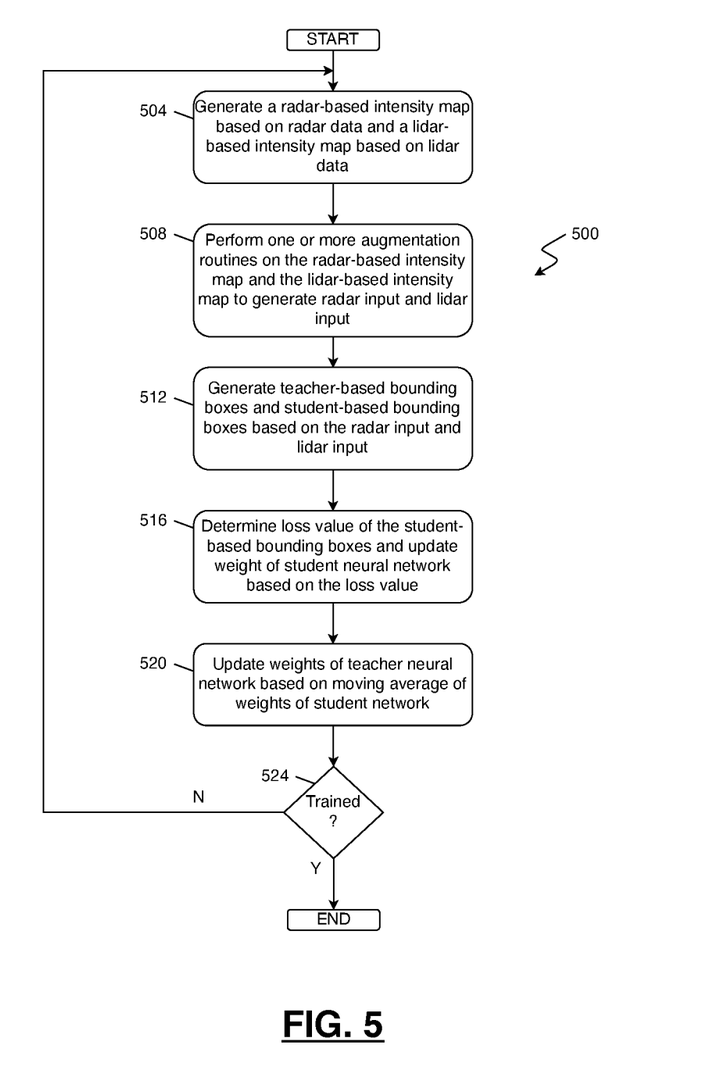
FIG. 5 is a flowchart of an example routine for training a student neural network in accordance with the teachings of the present disclosure.

Referring to FIG. 5, a flowchart illustrating a routine 500 for training a student neural network to detect one or more objects is shown. At 504, the radar intensity map module 40 generates a radar-based intensity map based on radar data obtained from the radar sensor 20, and the lidar intensity map module 50 generates a lidar-based intensity map based on lidar data obtained from the lidar sensor 30. At 508, the augmentation module 60 performs one or more augmentation routines on the radar-based intensity map and the lidar-based intensity map to generate a radar input and a lidar input. Additional details regarding the one or more augmentation routines performed at 508 are described below in further detail with reference to FIG. 6.

At 512, the teacher neural network 70 generates teacher-based bounding boxes based on the radar input and the lidar input, and the student neural network 80 generates student-based bounding boxes based on the radar input and the lidar input. Additional details regarding generating the proposed bounding boxes at 512 are described below in further detail with reference to FIG. 7.

At 516, the loss module 100 determines a loss value of the student-based bounding boxes and updates the weights of the student neural network 80 based on the loss values. At 520, the moving average module 90 updates the weights of the teacher neural network 70 based on the moving average of the weights of the student neural network 80. At 524, the loss module 100 determines whether the student neural network 80 is trained based on a comparison between the loss value and the threshold loss value. If the student neural network 80 is trained, the routine 500 ends. Otherwise, if the student neural network 80 is not trained, the routine 500 proceeds to 504.

Figure 6:
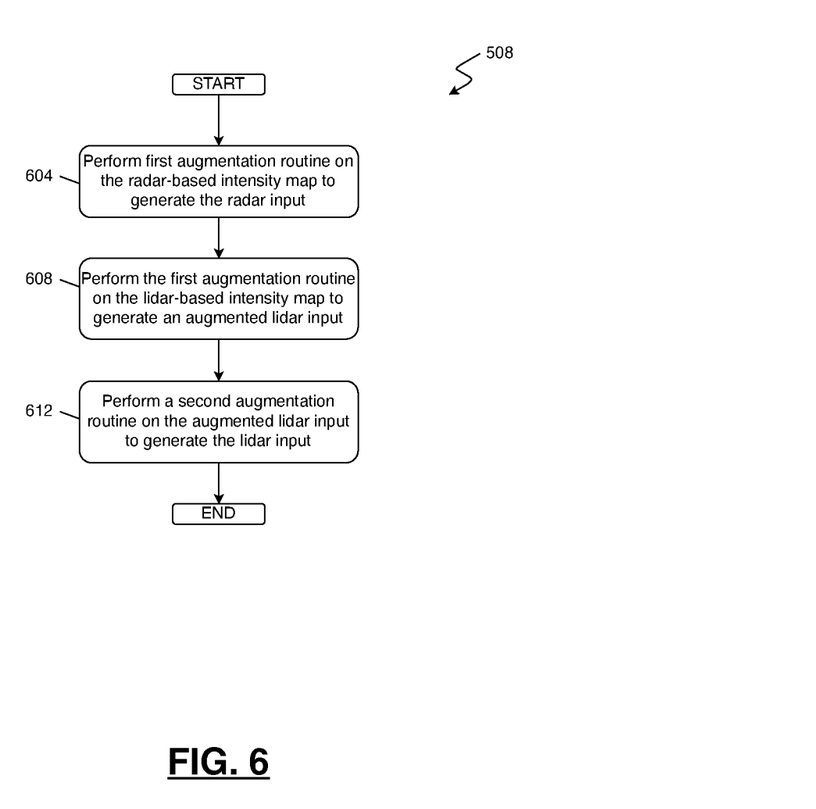
FIG. 6 is a flowchart of an example routine for performing one or more augmentation routines in accordance with the teachings of the present disclosure.

Referring to FIG. 6, a flowchart illustrating the routine for performing the one or more augmentation routines at step 508 of FIG. 5 is shown. At 604, the augmentation module 60 performs the first augmentation routine on the radar-based intensity map to generate the radar input (e.g., a translation routine, a rotation routine, a scaling routine, a flipping routine, or a combination thereof). At 608, the augmentation module 60 performs the first augmentation routine on the lidar-based intensity map to generate an augmented lidar input. At 612, the augmentation module 60 performs the second augmentation routine (e.g., the noise augmentation routine) on the augmented lidar input to generate the lidar input.

Figure 7:
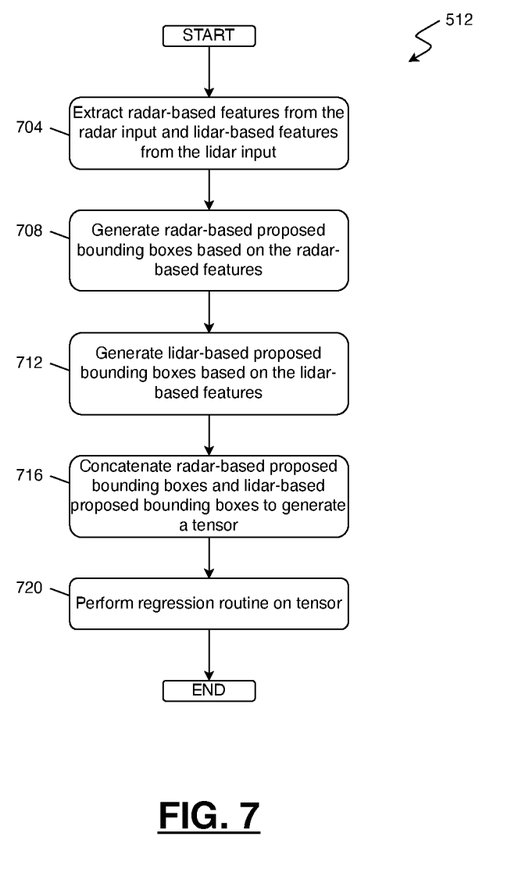
FIG. 7 is a flowchart of an example routine for generating proposed bounding boxes in accordance with the teachings of the present disclosure.

Referring to FIG. 7, a flowchart illustrating the routine for generating the bounding boxes at step 512 of FIG. 5 is shown. At 704, the radar feature extraction modules 71, 81 extract the radar-based features from the radar input, and the lidar feature extraction modules 72, 82 extract the lidar-based features from the lidar input. At 708, the proposed bounding box modules 73, 83 generate the radar-based proposed bounding boxes based on the radar features, and the proposed bounding box modules 73, 83 generate the lidar-based proposed bounding boxes based on the lidar features at 712. At 716, the concatenation modules 74, 84 concatenate the radar-based proposed bounding boxes and the lidar-based proposed bounding boxes to generate a tensor. At 720, the regression modules 75 perform the regression routine on the tensor to selectively adjust a portion of the tensor that corresponds to the features of the proposed bounding boxes.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for training a student neural network to detect one or more objects based on radar data obtained from one or more radar sensors and lidar data obtained from one or more lidar sensors, the method comprising:
   generating a radar-based intensity map based on the radar data and a lidar-based intensity map based on the lidar data;
   performing one or more augmentation routines on the radar-based intensity map and the lidar-based intensity map to generate a radar input and a lidar input;
   generating, using a teacher neural network, a plurality of teacher-based bounding boxes based on the radar input and the lidar input;
   generating, using the student neural network, a plurality of student-based bounding boxes based on the radar input and the lidar input;
   determining a loss value of the plurality of student-based bounding boxes based on the plurality of teacher-based bounding boxes and a plurality of ground truth bounding boxes;
   updating one or more weights of the student neural network based on the loss value; and
   updating one or more weights of the teacher neural network based on a moving average associated with the one or more weights of the student neural network.

2. The method of claim 1, wherein performing the one or more augmentation routines on the radar-based intensity map and the lidar-based intensity map to generate the radar input and the lidar input further comprises:
   performing a first augmentation routine on the radar-based intensity map to generate the radar input;
   performing the first augmentation routine on the lidar-based intensity map to generate an augmented lidar input; and
   performing a second augmentation routine on the augmented lidar input to generate the lidar input.

3. The method of claim 2, wherein the first augmentation routine is a translation routine, a rotation routine, a scaling routine, a flipping routine, or a combination thereof.

4. The method of claim 2, wherein the second augmentation routine is a noise augmentation routine.

5. The method of claim 1, wherein generating, using the teacher neural network, the plurality of teacher-based bounding boxes based on the radar input and the lidar input further comprises:
   extracting one or more radar-based features based on the radar input and one or more lidar-based features based on the lidar input;
   generating a plurality of radar-based proposed bounding boxes based on the one or more radar-based features and a plurality of lidar-based proposed bounding boxes based on the one or more lidar-based features;
   concatenating the plurality of radar-based proposed bounding boxes and the plurality of lidar-based proposed bounding boxes to generate a tensor; and
   performing a regression routine on the tensor to generate the plurality of teacher-based bounding boxes.

6. The method of claim 5, wherein the plurality of radar-based proposed bounding boxes and the plurality of lidar-based proposed bounding boxes are concatenated over a predefined period of time.

7. The method of claim 1, wherein generating, using the student neural network, the plurality of student-based bounding boxes based on the radar input and the lidar input further comprises:
   extracting one or more radar-based features based on the radar input and one or more lidar-based features based on the lidar input;
   generating a plurality of radar-based proposed bounding boxes based on the one or more radar-based features and a plurality of lidar-based proposed bounding boxes based on the one or more lidar-based features;
   concatenating the plurality of radar-based proposed bounding boxes and the plurality of lidar-based proposed bounding boxes to generate a tensor; and
   performing a regression routine on the tensor to generate the plurality of student-based bounding boxes.

8. The method of claim 7, wherein the plurality of radar-based proposed bounding boxes and the plurality of lidar-based proposed bounding boxes are concatenated over a predefined period of time.

9. The method of claim 1, wherein the moving average associated with the one or more weights of the student neural network is an exponential moving average.

10. The method of claim 1 further comprising determining the student neural network is trained in response to the loss value being less than a threshold value.

11. A system training a student neural network to detect one or more objects based on radar data obtained from one or more radar sensors and lidar data obtained from one or more lidar sensors, the system comprising:
one or more processors and one or more nontransitory computer-readable mediums storing instructions that are executable by the one or more processors, wherein the instructions comprise:
generating a radar-based intensity map based on the radar data and a lidar-based intensity map based on the lidar data;
performing one or more augmentation routines on the radar-based intensity map and the lidar-based intensity map to generate a radar input and a lidar input;
generating, using a teacher neural network, a plurality of teacher-based bounding boxes based on the radar input and the lidar input;
generating, using the student neural network, a plurality of student-based bounding boxes based on the radar input and the lidar input;
determining a loss value of the plurality of student-based bounding boxes based on the plurality of teacher-based bounding boxes and a plurality of ground truth bounding boxes;
updating one or more weights of the student neural network based on the loss value;
updating one or more weights of the teacher neural network based on an exponential moving average associated with the one or more weights of the student neural network; and
determining the student neural network is trained in response to the loss value being less than a threshold value.

12. The system of claim 11, wherein the instructions for performing the one or more augmentation routines on the radar-based intensity map and the lidar-based intensity map to generate the radar input and the lidar input further comprise:
performing a first augmentation routine on the radar-based intensity map to generate the radar input;
performing the first augmentation routine on the lidar-based intensity map to generate an augmented lidar input; and
performing a second augmentation routine on the augmented lidar input to generate the lidar input.

13. The system of claim 12, wherein:
the first augmentation routine is a translation routine, a rotation routine, a scaling routine, a flipping routine, or a combination thereof; and
the second augmentation routine is a noise augmentation routine.

14. The system of claim 11, wherein the instructions for generating, using the teacher neural network, the plurality of teacher-based bounding boxes based on the radar input and the lidar input further comprise:
extracting one or more radar-based features based on the radar input and one or more lidar-based features based on the lidar input;
generating a plurality of radar-based proposed bounding boxes based on the one or more radar-based features and a plurality of lidar-based proposed bounding boxes based on the one or more lidar-based features;
concatenating the plurality of radar-based proposed bounding boxes and the plurality of lidar-based proposed bounding boxes to generate a tensor; and
performing a regression routine on the tensor to generate the plurality of teacher-based bounding boxes.

15. The system of claim 11, wherein the instructions for generating, using the student neural network, the plurality of student-based bounding boxes based on the radar input and the lidar input further comprise:
extracting one or more radar-based features based on the radar input and one or more lidar-based features based on the lidar input;
generating a plurality of radar-based proposed bounding boxes based on the one or more radar-based features and a plurality of lidar-based proposed bounding boxes based on the one or more lidar-based features;
concatenating the plurality of radar-based proposed bounding boxes and the plurality of lidar-based proposed bounding boxes to generate a tensor; and
performing a regression routine on the tensor to generate the plurality of student-based bounding boxes.

16. A method for training a student neural network to detect one or more objects based on radar data obtained from one or more radar sensors and lidar data obtained from one or more lidar sensors, the method comprising:
generating a radar-based intensity map based on the radar data and a lidar-based intensity map based on the lidar data;
performing a first augmentation routine on the radar-based intensity map to generate the radar input;
performing the first augmentation routine on the lidar-based intensity map to generate an augmented lidar input; and
performing a second augmentation routine on the augmented lidar input to generate the lidar input;
generating, using a teacher neural network, a plurality of teacher-based bounding boxes based on the radar input and the lidar input;
generating, using the student neural network, a plurality of student-based bounding boxes based on the radar input and the lidar input;
determining a loss value of the plurality of student-based bounding boxes based on the plurality of teacher-based bounding boxes and a plurality of ground truth bounding boxes;
updating one or more weights of the student neural network based on the loss value;
updating one or more weights of the teacher neural network based on a moving average associated with the one or more weights of the student neural network; and
determining the student neural network is trained in response to the loss value being less than a threshold value.

17. The method of claim 16, wherein:
the first augmentation routine is a translation routine, a rotation routine, a scaling routine, a flipping routine, or a combination thereof; and
the second augmentation routine is a noise augmentation routine.

18. The method of claim 16, wherein generating, using the teacher neural network, the plurality of teacher-based bounding boxes based on the radar input and the lidar input further comprises:

extracting one or more radar-based features based on the radar input and one or more lidar-based features based on the lidar input;

generating a plurality of radar-based proposed bounding boxes based on the one or more radar-based features and a plurality of lidar-based proposed bounding boxes based on the one or more lidar-based features;

concatenating the plurality of radar-based proposed bounding boxes and the plurality of lidar-based proposed bounding boxes to generate a tensor; and performing a regression routine on the tensor to generate the plurality of teacher-based bounding boxes.

19. The method of claim 16, wherein generating, using the student neural network, the plurality of student-based bounding boxes based on the radar input and the lidar input further comprises:

extracting one or more radar-based features based on the radar input and one or more lidar-based features based on the lidar input;

generating a plurality of radar-based proposed bounding boxes based on the one or more radar-based features and a plurality of lidar-based proposed bounding boxes based on the one or more lidar-based features;

concatenating the plurality of radar-based proposed bounding boxes and the plurality of lidar-based proposed bounding boxes to generate a tensor; and performing a regression routine on the tensor to generate the plurality of student-based bounding boxes.

20. The method of claim 16, wherein the moving average associated with the one or more weights of the student neural network is an exponential moving average.

* * * * *